Jan. 2, 1945. A. N. MILSTER 2,366,207
BRAKING SYSTEM FOR ASSISTING VEHICLE STEERING
Filed March 9, 1942 3 Sheets-Sheet 1
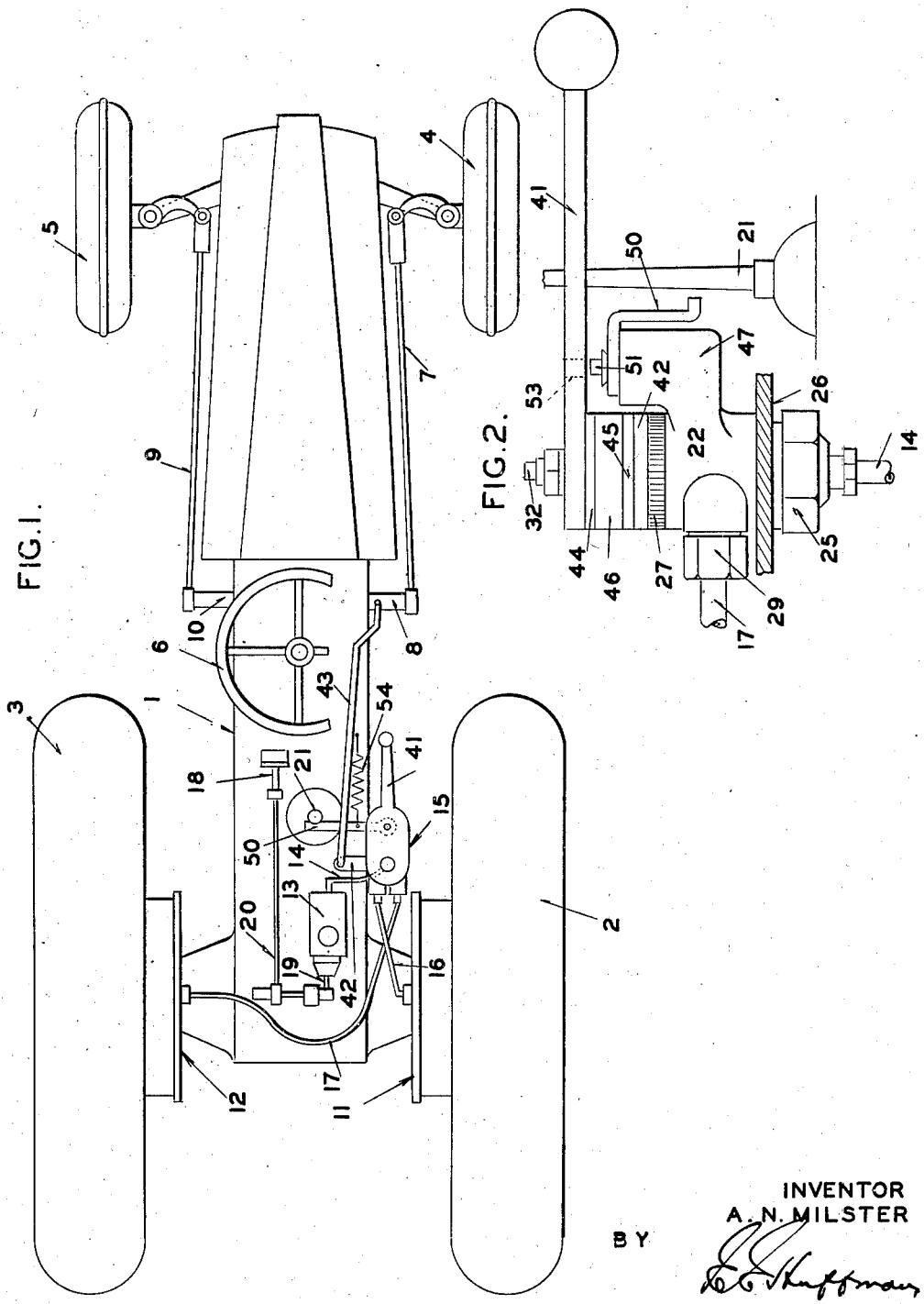
INVENTOR
A. N. MILSTER
BY
ATTORNEY Jan. 2, 1945.  A. N. MILSTER  2,366,207
BRAKING SYSTEM FOR ASSISTING VEHICLE STEERING
Filed March 9, 1942  3 Sheets-Sheet 2
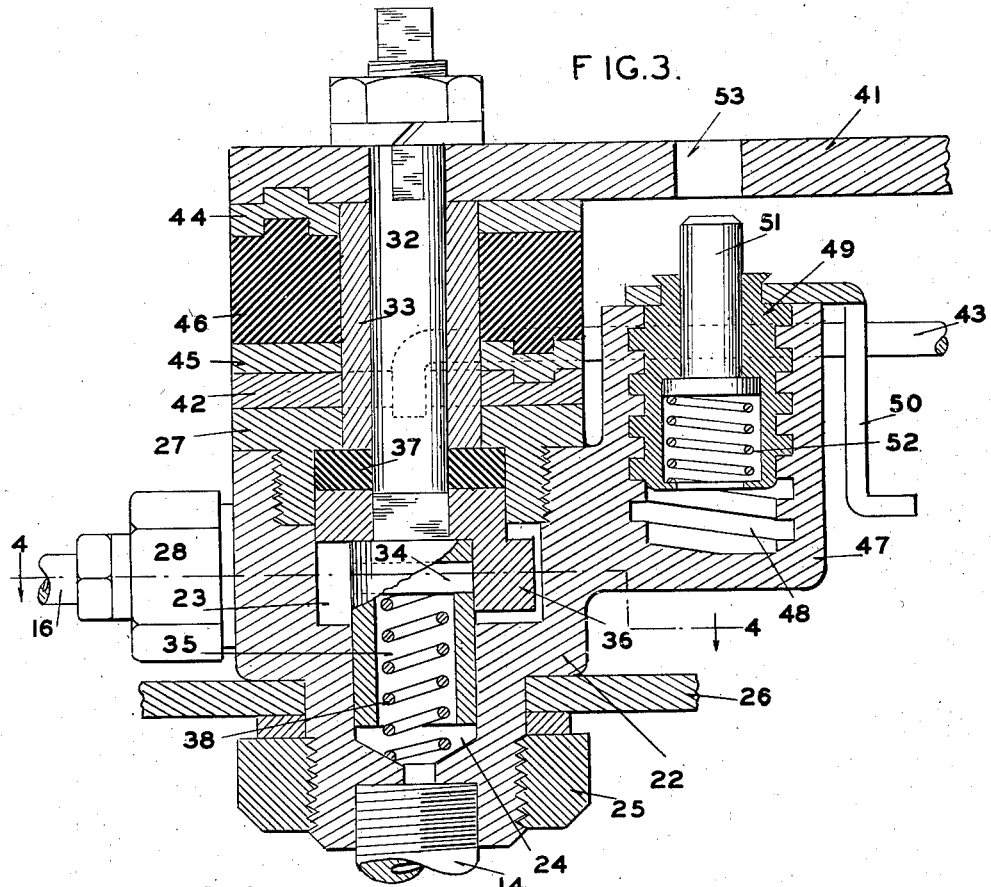
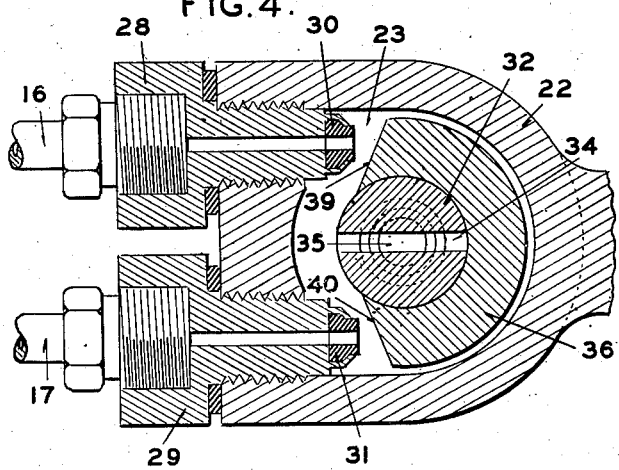
INVENTOR
A. N. MILSTER
BY
ATTORNEY

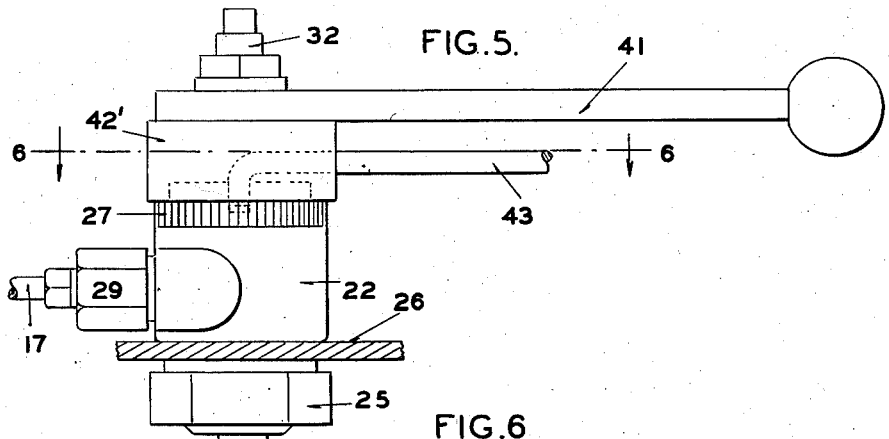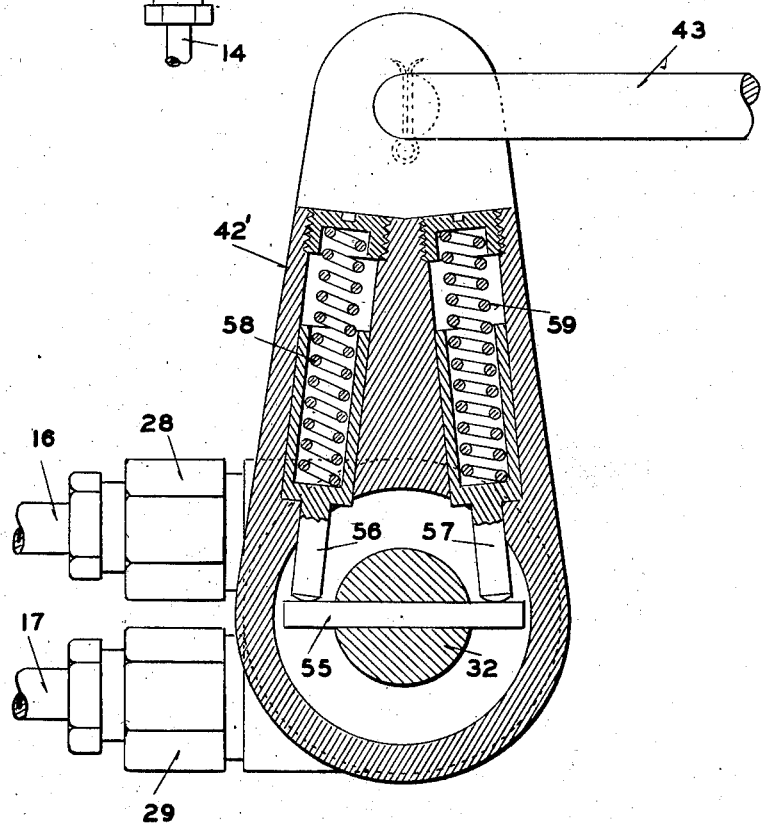

Patented Jan. 2, 1945

2,366,207

UNITED STATES PATENT OFFICE 2,366,207

BRAKING SYSTEM FOR ASSISTING VEHICLE STEERING

Arthur N. Milster, Ferguson, Mo., assignor to Wagner Electric Corporation, St. Louis, Mo., a corporation of Delaware Application March 9, 1942, Serial No. 433,931

13 Claims. (Cl. 180—18)

My invention relates to brakes and more particularly to a braking system for a vehicle which can be employed to assist in the steering thereof.

One of the objects of my invention is to provide an improved braking system for a vehicle which can be so automatically controlled during certain turning of the vehicle by its steering mechanism that the brake on the inside only can be applied when the brake actuating means is operated and thus aid in turning the vehicle.

Another object of my invention is to embody in the kind of a braking system referred to, means whereby the vehicle operator can manually control the braking system as desired and at the same time prevent said braking system from being controlled in any way by the steering of the vehicle.

Yet another object of my invention is to provide additional control means for a braking system of the kind referred to which will automatically prevent said control means, which is normally operative during the turning of the vehicle from being operated whenever a control member for driving the vehicle is in a predetermined position.

Other objects of my invention will become apparent from the following description taken in connection with the accompanying drawings in which Figure 1 is a top view of a tractor vehicle equipped with a braking system embodying my invention; Figure 2 is a side view of the control valve and associated structure; Figure 3 is a longitudinal sectional view of said control valve; Figure 4 is another sectional view of the valve, said view being taken on the lines 4—4 of Figure 3 as viewed in the direction shown by the arrows; Figure 5 is a side view of a differently constructed control valve; and Figure 6 is a sectional view taken on the line 6—6 of Figure 5.

Referring to the drawings and particularly to Figure 1, there is shown a tractor vehicle having a body 1, driving wheels 2 and 3 and dirigible wheels 4 and 5. The body has mounted thereon a steering wheel 6 for turning the dirigible wheels, wheel 4 being connected to the steering gear of the steering wheel by a mechanism comprising a link 7 and an arm 8 and wheel 5 being connected to the steering gear of the steering wheel by a mechanism comprising a link 9 and an arm 10, all in a well-known manner. Driving wheels 2 and 3 are provided with brakes 11 and 12, respectively, which are adapted to be hydraulically actuated by fluid pressure developed by a master cylinder 13. The outlet of this master cylinder is connected to a conduit 14 which leads through my improved control valve mechanism 15 to the conduits 16 and 17 leading to the brakes on the left and right driving wheels, respectively. The master cylinder is actuated by a pedal 18 which is connected to the piston rod 19 of the master cylinder by suitable rods, shafts, and levers generally indicated by the reference character 20. The tractor is provided with the usual change speed gearing which is shifted to its different speed ratios by a gear shift lever 21. This gear shift lever is so arranged with the change speed gearing that the higher speed ratios of the gearing are obtained by a rearward movement of the gear shift lever and the other speed ratios by a forward movement.

Referring to Figures 2, 3, and 4, there is shown details of my improved control valve mechanism. This valve mechanism comprises a casing 22 provided with connecting bores 23 and 24. The casing 22 is clamped by a nut 25 to a suitable mounting bracket 26 carried by the vehicle frame. The upper end of the large bore 23 is closed by a plug 27 screwed into the end of the bore. The small bore 24 is connected to conduit 14 leading from the master cylinder and the large bore 23 is connected to the conduits 16 and 17 by suitable fittings 28 and 29. These fittings project into bore 23 and carry on their ends the annular seats 30 and 31.

Extending into the bores is a shaft 32, the lower end of which snugly fits the bore 24 in order that said bore may act as a bearing. The outer end of the shaft which extends through plug 27 is journaled in a bearing sleeve 33 carried by said plug. The portion of the shaft in bore 23 is provided with a cross-passage 34 which connects with an axial bore 35 leading to the end of the shaft to thereby place the large bore in communication with conduit 14 coming from the master cylinder. Non-rotatably mounted on the portion of the shaft in bore 23 is a segment member 36 and interposed between this segment member and the plug is a packing element 37 for sealing the shaft at the plug, said packing element being compressed between the plug and the segment member by a coil spring 38 positioned in the axial passage 35 and having one end abutting the end of bore 24.

The segment member 36 is provided with surfaces 39 and 40 which are adapted to cooperate with the annular valve seats 30 and 31, respectively, carried by the fittings 28 and 29. The segment member is so constructed that both surfaces 39 and 40 can be simultaneously disengaged from the seats with which they cooperate when the shaft is in a predetermined position, as shown in Figure 4. When the shaft is rotated in a counter-clockwise direction from this position, as viewed from the top of Figure 4, surface 39 will be placed in engagement with seat 30 and thus prevent fluid from flowing out of bore 23 to conduit 16 leading to the right wheel brake. When the shaft is rotated in a clockwise direction from the predetermined position, surface 40 will engage with seat 31 and thus prevent fluid from flowing from bore 23 to conduit 17 leading to the left wheel brake.

The extreme outer end of shaft 32 has secured thereto a control handle 41, said handle being in spaced relation to plug 27. The portion of sleeve 33 adjacent plug 27 has rotatably mounted thereon an arm 42, the outer end of which is connected by means of a rod 43 to arm 8 of the connecting mechanism between the steering wheel and the right front wheel 4. The handle 41 has non-rotatably associated therewith a disc 44 and a like disc 45 is non-rotatably associated with arm 42. These discs are in spaced relation and interposed therebetween is an annular rubber member 46, said rubber member being secured to each disc as, for example, by a bonding process. This annular rubber member establishes a yieldable connection between arm 42 and shaft 32 since disc 45 is secured to the arm and disc 44 is non-rotatably secured to the handle which in turn is non-rotatably secured to the shaft. Thus if arm 42 is rotated in either direction from its central position corresponding to the straight ahead position of wheels 4 and 5, as shown in Figure 4, force can be transmitted through the rubber member to rotate the shaft in unison therewith. When the shaft is rotated, segment member 36 will also be rotated and it is thus seen that communication between the master cylinder and conduits 16 and 17 can thereby be controlled. Also, because of the rubber member it is seen that shaft 32 can be rotated, if desired, by the handle 41, regardless of any position of arm 42. The yielding of the rubber of the rubber member will permit relative movement between handle 41 and arm 42. It is thus seen that the valve may be manually controlled by the handle in any manner desired.

The valve casing 22 is provided with an integral projecting portion 47 which is provided with a threaded bore 48, the axis of which is parallel to the axis of shaft 32. Cooperating with this threaded bore is a threaded plug 49 which extends out of the end of the bore and has secured thereto an arm 50. As best seen in Figure 1, this arm extends outwardly to a point behind the gear shift lever 21 in order that the threaded plug 49 may be rotated by the gear shift lever. Carried by the plug is a plunger 51 which projects out of the end of the plug and is backed by a spring 52 for biasing it in this projected position. The integral portion 47 carrying the threaded plug is positioned so as to be directly beneath the handle 41. The handle is provided with an opening 53 so that when the handle is in its central position (the position in which segment member 36 of the valve mechanism permits free communication from the master cylinder to both conduits 16 and 17) said opening will be directly over plunger 51 and can receive the plunger if the threaded plug 49 is moved upwardly by a rotation thereof. The upward movement of the plug will only occur when the gear shift lever is moved rearwardly so as to rotate arm 50 in a counter-clockwise direction, as viewed in Figure 1. In order that the threaded plug 49 may be returned to its inoperative position and the plunger retracted from opening 53, the arm has connected thereto a spring 54.

Referring to the operation, the parts of the valve mechanism and the control means therefor will be in their positions shown whenever the tractor vehicle is being driven forwardly in a straight line with the gear shift lever in its low speed, that is, the gear shift lever is moved forwardly from its position shown in Figure 2. Under these conditions handle 41 is not locked by plunger 51 and, therefore, shaft 32 is free to be moved. If the dirigible wheels of the tractor vehicle are turned in either direction through a portion of their maximum turning angle from straight ahead positions, arm 42, shaft 32, and segment member 36 will be turned with the steering mechanism. The rotation of said segment member, however, will be insufficient to cause shutting off of either conduit leading to the brakes as the segment member is so formed that the surfaces thereon will engage a seat only when the wheels are so turned as to make a short turn. Under these conditions both brakes can be applied at will by operation of the master cylinder.

If the tractor should, for example, be turned sharply to the right and to such an extent that arm 42 and shaft 32 will be so rotated that the segment member will cause surface 40 to be engaged with seat 31, passage 17 will be shut off so that the master cylinder cannot communicate therewith. Thus no fluid under pressure can be transmitted to the left wheel brake. If the master cylinder is now operated, only the right wheel brake will be applied. This brake application will hold the driving wheel 2 from turning and permit the tractor to pivot around this wheel. It is thus seen that by the braking arrangement sharp turning is considerably aided. If there should be additional movement of the steering mechanism after surface 40 is brought into engagement with seat 31, the rubber member 46 will permit arm 42 to have relative movement with respect to shaft 32.

If the steering mechanism is operated to make a sharp turn to the left, then the segment member 36 will be moved to a position where surface 39 engages seat 30 thus closing off the conduit leading to the right wheel brake. If the brakes are now applied, the left wheel brake only will be applied thereby holding wheel 3 stationary so that the vehicle can turn around this wheel as a pivot and make the desired turn.

If, at any time, it is desired to prevent the steering mechanism from controlling the segment member 36 so that both brakes can be applied simultaneously regardless of the extent the steering mechanism is turned, this can be accomplished by holding handle 41 in its central position which is the position shown in Figures 1 and 4. Under these conditions arm 42 will be moved with the steering mechanism but shaft 32 will not turn therewith. The rubber member 46 will be twisted and permit the arm to be moved by the steering mechanism and have the necessary relative movement with respect to the shaft.

If it should be desired to apply the brake on the outside wheel of the vehicle only when the steering mechanism is turned, this can be done by the proper movement of the handle. The segment member 36 can be controlled at will by the handle regardless of the position of arm 42 as determined by the position of the steering mechanism. This is found to be a very desirable feature since there may be times when it is desired to brake the wheel on the outside of the turn, as, for example, when said outside wheel is in soggy ground. Under such circumstances getting the vehicle out of said soggy ground can be facilitated if the outside wheel (the one in the soggy ground) is braked.

It has also been discovered that it is highly desirable to prevent the steering mechanism from controlling the control valve mechanism when the vehicle is being driven on a highway at a fast rate in a high gear. If the steering mechanism should be capable of controlling the valve under these conditions, a serious accident might result. The operator of the vehicle might decide to make a fairly sharp turn and at the same time apply the brakes. If this were done with the valve under the control of the steering mechanism, only the inside wheel would be braked, thereby increasing the sharpness of the turn and causing the vehicle to move in an undesired direction. When the vehicle is moving at a high speed in a high gear, the gear shift lever is employed to cause the valve mechanism to be locked so that neither brake can be cut off. Whenever the gear shift lever is in a rearward position corresponding to high gear, as indicated by the dashed lines in Figure 2, arm 50 will be moved so as to rotate plug 49 and cause plunger 51 to be moved up into opening 53 of the handle. This will prevent any movement of said handle from its central position where both brakes are in direct communication with the master cylinder. Thus it is seen that under these conditions both brakes will always be applied whenever the vehicle is being driven at a high speed on a highway. When the gear shift lever is in its forward position corresponding to low speeds, the valve will be under the control of the steering mechanism.

In Figures 5 and 6 I have shown a slightly modified arrangement for the connection between the steering mechanism and the valve shaft 32. In this arrangement the function of the annular rubber member 46 is replaced by means of springs. As best shown in Figure 6, shaft 32 is provided with a pin 55 and arm 42' carries plungers 56 and 57 for cooperation with the ends of the pin. The plunger 56 is biased to engage the pin by a spring 58 and plunger 57 is biased to engage the pin by a spring 59. The springs and plungers are all enclosed within arm 42' in order that dust or other foreign materials will be excluded from the moving parts. The arm 42' is interposed between the handle 41 and the closure plug 27 and the outer end of said arm is connected by rod 43 to the steering mechanism in the same manner as arm 42 of the previously described valve mechanism. All the other parts of the valve mechanism are the same as previously described, these parts being designated by the same reference characters. The operation of the modified construction is the same as the construction shown in Figures 1 to 4. When arm 42' is rotated and handle 41 is free, shaft 32 will be rotated therewith since springs 58 and 59 are of such strength that force can be transmitted to said shaft. If it is desired to control the shaft and the segment member 36 by hand, the handle 41 is turned and one of the springs is compressed in order to permit relative movement between shaft 32 and arm 42'. In the construction shown in Figures 5 and 6 the gear shift lever control is not shown but it may be incorporated therein in the same manner as disclosed in Figures 1 to 4.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a vehicle provided with a steering mechanism, with an operator-operated member forming part of a means for controlling the moving of the vehicle in a normal manner and two driving members associated therewith, a braking system for the driving members, means operable when the steering mechanism is controlled to turn the vehicle in one direction for so controlling the braking system that when it is operated only one brake of said driving members will be applied and when controlled to turn the vehicle in the other direction for so controlling the braking system that when it is operated the other brake only of said driving members will be applied, a lever for manually selectively actuating each of said means, and means operable when the operator-operated member is in a predetermined condition assumed during the controlling of the moving of the vehicle for preventing the steering mechanism from controlling the braking system, said means including a manually adjustable detent mechanism engageable with said lever to prevent movement thereof when said operator-operated member is in said predetermined condition.

2. In a vehicle provided with a steering mechanism, with a change speed gearing and two driving members associated therewith, a braking system for the driving members, means operable when the steering mechanism is controlled to turn the vehicle in one direction for so controlling the braking system that when it is operated only one brake of said driving members will be applied and when controlled to turn the vehicle in the other direction for so controlling the braking system that when it is operated the other brake only of said driving members will be applied, said means including a lever for manually selectively actuating said means, and means operable when the change speed gearing is in a predetermined condition for preventing the steering mechanism from controlling the braking system, said means including a manually adjustable detent mechanism engageable with said lever to prevent movement thereof when said change speed gearing is in said predetermined condition.

3. In a vehicle provided with a steering mechanism, a change speed gearing and two driving members associated therewith, a braking system for the driving members, means operable when the steering mechanism is controlled to turn the vehicle in one direction for so controlling the braking system that when it is operated only one brake of said driving members will be applied and when controlled to turn the vehicle in the other direction for so controlling the braking system that when it is operated the other brake only of said driving members will be applied, a manual means to operate said means, and means operable when the change speed gearing is in one of its higher speed ratios for preventing the steering mechanism from controlling the braking system including a detent mechanism engageable with said manual means.

4. In a vehicle provided with a steering mechanism, a change speed gearing and two driving members associated therewith, a braking system for the driving members, means operable when the steering mechanism is controlled to turn the vehicle in one direction for so controlling the braking system that when it is operated only one brake of said driving members will be applied and when controlled to turn the vehicle in the other direction for controlling the braking system that when it is operated the other brake only of said driving members will be applied, manually operable means for preventing the steering mechanism from controlling the braking system, and means operable when the change speed gearing is in a higher speed ratio for positively locking said manually operable means in a position where both driving members can be braked regardless of the condition of the steering mechanism, said means including a detent mechanism engageable with said manually operable means.

5. In a vehicle provided with a dirigible wheel, a steering mechanism therefor, with an operator-operated member forming part of a means for controlling the moving of the vehicle in a normal manner and with non-dirigible wheels on opposite sides of the vehicle, a fluid pressure actuated braking system for the non-dirigible wheels, valve means operable when the dirigible wheel is turned by the steering mechanism in one direction from a central position for causing the braking system when operated to brake only the non-dirigible wheel which is on that side of the vehicle corresponding to the direction in which the vehicle is being turned, other valve means operable when the dirigible wheel is turned in the other direction for causing the braking system when operated to brake only the other non-dirigible wheel, and means operable when the operator-operated member is in a predetermined position assumed during the controlling of the moving of the vehicle for preventing the steering mechanism from placing either valve means in an operable condition.

6. In a vehicle provided with a dirigible wheel, steering mechanism therefor, with a change speed gearing and with non-dirigible wheels on opposite sides of the vehicle, a fluid pressure actuated braking system for the non-dirigible wheels, valve means operable when the dirigible wheel is turned by the steering mechanism in one direction from a central position for causing the braking system when operated to brake only the non-dirigible wheel which is on that side of the vehicle corresponding to the direction in which the vehicle is being turned, other valve means operable when the dirigible wheel is turned in the other direction for causing the braking system when operated to brake only the other non-dirigible wheel, means operable at will for holding both valve means inoperable or either valve means operable notwithstanding any and all movements of the steering mechanism, and means operable when the change speed gearing is in a predetermined condition for preventing either valve from being placed in an operable position by the steering mechanism.

7. In a vehicle provided with a dirigible wheel, a steering mechanism therefor, with a change speed gearing and with non-dirigible wheels on opposite sides of the vehicle, a fluid pressure actuated braking system for the non-dirigible wheels, valve means operable when the dirigible wheel is turned by the steering mechanism in one direction from a central position for causing the braking system when operated to brake only the non-dirigible wheel which is on that side of the vehicle corresponding to the direction in which the vehicle is being turned, other valve means operable when the dirigible wheel is turned in the other direction for causing the braking system when operated to brake only the other non-dirigible wheel, and means operable when the change speed gearing is in a predetermined condition for preventing either valve means from being placed in an operable position by the steering mechanism.

8. In a vehicle provided with a dirigible wheel, steering mechanism therefor and with non-dirigible wheels on opposite sides of the vehicle, a fluid pressure actuated braking system for the non-dirigible wheels comprising a source of pressure in communication with a brake actuating device on each wheel, valve means for shutting off communication between the source and one brake actuating device, valve means for shutting off communication between the source and the other brake actuating device, a movable member connected to operate both valve means and having one position where both valve means are inoperative and positions on opposite sides thereof where the valve means can be selectively made operative, a connection between the steering mechanism and the movable member, yieldable means in said connection permitting the steering mechanism to be moved independently of the member or the member to be moved independently of the steering mechanism, and a member connected to the movable member for permitting the operator to move the movable member at will without regard to the condition of the steering mechanism or manually hold it in a fixed position preventing any movement by the steering mechanism.

9. In a vehicle provided with a dirigible wheel, a steering mechanism therefor, with a change speed gearing and with non-dirigible wheels on opposite sides of the vehicle, a fluid pressure actuated braking system for the non-dirigible wheels comprising a source of pressure in communication with a brake actuating device on each wheel, valve means for shutting off communication between the source and one brake actuating device, valve means for shutting off communication between the source and the other brake actuating device, a movable member connected to operate both valve means and having one position where both valve means are inoperative and positions on opposite sides thereof where the valve means can be selectively made operative, a connection between the steering mechanism and the movable member, yieldable means in said connection permitting the steering mechanism to be moved independently of the member or the member to be moved independently of the steering mechanism, a manual member connected to the movable member for permitting the operator to move the movable member at will without regard to the condition of the steering mechanism or manually hold it from any movement by the steering mechanism, and means for positively locking the movable member in its central position when the change speed gearing is in one of its highest gear ratios.

10. In a vehicle provided with a dirigible wheel, steering mechanism therefor and with non-dirigible wheels on opposite sides of the vehicle, a fluid pressure-actuated braking system for the non-dirigible wheels comprising a source of pressure in communication with a brake actuating device on each wheel, valve means for shutting off communication between the source and one brake actuating device, valve means for shutting off communication between the source and the other brake actuating device, a movable member connected to operate both valve means and having one position where both valve means are inoperative and positions on opposite sides thereof where the valve means can be selectively made operative, a connection between the steering mechanism and the movable members, yieldable means in said connection permitting the steering mechanism to be moved independently of the member, and means for positively locking said member in a predetermined position so that when the steering mechanism is moved the yieldable means will yield and no movement of the member will take place.

11. In a vehicle provided with a dirigible wheel, a steering mechanism therefor, with a change speed gearing and with non-dirigible wheels on opposite sides of the vehicle, a fluid pressure actuated braking system for the non-dirigible wheels comprising a source of pressure in communication with a brake actuating device on each wheel, valve means for shutting off communication between the source and one brake actuating device, valve means for shutting off communication between the source and the other brake actuating device, a movable member connected to operate both valve means and having one position where both valve means are inoperative and positions on opposite sides thereof where the valve means can be selectively made operative, a connection between the steering mechanism and the movable members, yieldable means in said connection permitting the steering mechanism to be moved independently of the member, and means for positively locking said member in a position where both valves are open when the change speed gearing is in a predetermined speed ratio.

12. In a vehicle provided with a dirigible wheel, a steering mechanism therefor and with non-dirigible wheels on opposite sides of the vehicle, a fluid pressure actuated braking system for the non-dirigible wheels comprising a source of pressure in communication with a brake actuating device on each wheel, valve means for shutting off communication between the source and one brake actuating device, valve means for shutting off communication between the source and the other brake actuating device, a shaft connected to operate both valve means and having one position where both valve means are inoperative and positions on opposite sides thereof where the valve means can be selectively made operative, an arm for rotating the shaft, a yieldable connection comprising two springs between said arm and the shaft permitting said shaft to be moved by the arm but capable of yielding to permit the arm to be moved independently of the shaft if the shaft is held from turning, a connection between said arm and the steering mechanism, and a manual member connected to the shaft whereby the operator can move the shaft at will by causing a yielding of the yieldable connection.

13. In a vehicle provided with a dirigible wheel, a steering mechanism therefor and with non-dirigible wheels on opposite sides of the vehicle, a fluid pressure actuated braking system for the non-dirigible wheels comprising a source of pressure in communication with a brake actuating device on each wheel, valve means for shutting off communication between the source and one brake actuating device, valve means for shutting off communication between the source and the other brake actuating device, a shaft connected to operate both valve means and having one position where both valve means are inoperative and positions on opposite sides thereof where the valve means can be selectively made operative, an arm for rotating the shaft, a yieldable connection between said arm and the shaft permitting said shaft to be moved by the arm but capable of yielding to permit the arm to be moved independently of the shaft if the shaft is held from turning, a connection between said arm and the steering mechanism, a manual member connected to the shaft whereby the operator can move the shaft at will by causing a yielding of the yieldable connection, and means for locking said shaft in the position where both valve means are open.

ARTHUR N. MILSTER.